US009802126B2

(12) United States Patent
Reiche et al.

(10) Patent No.: US 9,802,126 B2
(45) Date of Patent: *Oct. 31, 2017

(54) INTERACTIVE VIDEO GAME SYSTEM COMPRISING TOYS WITH REWRITABLE MEMORIES

(71) Applicant: Activision Publishing, Inc., Santa Monica, CA (US)

(72) Inventors: Paul Reiche, Novato, CA (US); Ray West, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,822

(22) Filed: Dec. 30, 2016

(65) Prior Publication Data

US 2017/0106288 A1  Apr. 20, 2017

Related U.S. Application Data

(63) Continuation of application No. 15/293,808, filed on Oct. 14, 2016, which is a continuation of application
(Continued)

(51) Int. Cl.
*A63F 9/24* (2006.01)
*A63F 13/69* (2014.01)
(Continued)

(52) U.S. Cl.
CPC ............ *A63F 13/69* (2014.09); *A63F 13/235* (2014.09); *A63F 13/25* (2014.09); *A63F 13/58* (2014.09)

(58) Field of Classification Search
CPC .............. A63F 2300/20; A63F 2300/30; A63F 2300/206; A63F 13/02; A63F 3/00075; A63H 2200/00; A63H 2200/02
(Continued)

(56) References Cited

U.S. PATENT DOCUMENTS 4,840,602 A  6/1989  Rose
5,413,355 A  5/1995  Gonzalez
(Continued)

FOREIGN PATENT DOCUMENTS

GB    2365796 A     2/2002
JP    2003-210843 A  7/2003
WO    WO 2007-101785 A1  9/2007

OTHER PUBLICATIONS

International Search Report on related PCT Application No. PCT/US2013/073924 from International Searching Authority (KIPO) dated Mar. 11, 2014.
(Continued)

*Primary Examiner* — Masud Ahmed
(74) *Attorney, Agent, or Firm* — Klein, O'Neill & Singh, LLP

(57) ABSTRACT

The invention disclosed herein relates to a video game system comprising a video game console and an object or toy used in connection with the video game console, wherein the object or toy has a rewritable data storage device, and wherein the video game console stores information in the rewritable data storage device in response to game play events occurring in a first gaming session. The stored information is subsequently retrieved by the video game console in a second gaming session, and the retrieved information is used to conduct the game play of the second gaming session.

16 Claims, 13 Drawing Sheets

Related U.S. Application Data

No. 14/493,215, filed on Sep. 22, 2014, now Pat. No. 9,486,702, which is a continuation of application No. 13/711,502, filed on Dec. 11, 2012, now Pat. No. 8,858,339.

(51) Int. Cl.
*A63F 13/235* (2014.01)
*A63F 13/25* (2014.01)
*A63F 13/58* (2014.01)

(58) Field of Classification Search
USPC ...................................... 463/31–42; 446/175
See application file for complete search history.

(56) References Cited

U.S. PATENT DOCUMENTS

| | | |
|---|---|---|
| 5,533,920 A | 7/1996 | Arad et al. |
| 5,661,470 A | 8/1997 | Karr |
| 5,752,880 A | 5/1998 | Gabai et al. |
| 5,873,765 A | 2/1999 | Rifkin et al. |
| 5,876,262 A | 3/1999 | Kelly et al. |
| 6,056,618 A | 5/2000 | Larian |
| 6,083,073 A | 7/2000 | McFarlane et al. |
| 6,167,353 A | 12/2000 | Piernot et al. |
| 6,190,174 B1 | 2/2001 | Lam |
| 6,290,565 B1 | 9/2001 | Galyean, III et al. |
| 6,354,947 B1 | 3/2002 | Dobrusskin et al. |
| 6,491,566 B2 | 12/2002 | Peters et al. |
| 6,544,097 B1 | 4/2003 | Bain |
| 6,709,336 B2 | 3/2004 | Siegel et al. |
| 6,737,957 B1 | 5/2004 | Petrovic et al. |
| 6,761,637 B2 | 7/2004 | Weston et al. |
| 6,773,325 B1 | 8/2004 | Mawle et al. |
| 6,796,908 B2 | 9/2004 | Weston |
| 6,800,013 B2 | 10/2004 | Liu |
| 7,037,166 B2 | 5/2006 | Shrock et al. |
| 7,081,033 B1 | 7/2006 | Mawle et al. |
| 7,244,183 B1 | 7/2007 | England |
| 7,500,917 B2 | 3/2009 | Barney et al. |
| 7,524,246 B2 | 4/2009 | Briggs et al. |
| 7,614,958 B2 | 11/2009 | Weston et al. |
| 7,843,471 B2 | 11/2010 | Doan et al. |
| 7,850,527 B2 | 12/2010 | Barney et al. |
| 7,878,905 B2 | 2/2011 | Weston et al. |
| 8,033,901 B2 | 10/2011 | Wood |
| 8,287,372 B2 | 10/2012 | Hong et al. |
| 2002/0132553 A1 | 9/2002 | Jelinek |
| 2003/0008714 A1 | 1/2003 | Tajiri et al. |
| 2003/0037075 A1 | 2/2003 | Hannigan et al. |
| 2004/0178886 A1 | 9/2004 | Watanabe et al. |
| 2004/0214642 A1 | 10/2004 | Beck |
| 2006/0030410 A1 | 2/2006 | Stenton et al. |
| 2006/0273909 A1 | 12/2006 | Heiman et al. |
| 2007/0015588 A1 | 1/2007 | Matsumoto et al. |
| 2007/0143679 A1 | 6/2007 | Resner |
| 2007/0250597 A1 | 10/2007 | Resner et al. |
| 2008/0009350 A1 | 1/2008 | Ganz |
| 2008/0085773 A1 | 4/2008 | Wood |
| 2008/0139309 A1 | 6/2008 | Siegel et al. |
| 2008/0153594 A1 | 6/2008 | Zheng |
| 2008/0163055 A1 | 7/2008 | Ganz et al. |
| 2008/0274805 A1 | 11/2008 | Ganz et al. |
| 2008/0274806 A1 | 11/2008 | Ganz et al. |
| 2008/0274811 A1 | 11/2008 | Ganz et al. |
| 2008/0280684 A1 | 11/2008 | McBride et al. |
| 2008/0305873 A1 | 12/2008 | Zheng |
| 2009/0053970 A1 | 2/2009 | Borge |
| 2009/0054155 A1 | 2/2009 | Borge |
| 2009/0063271 A1 | 3/2009 | Ganz et al. |
| 2009/0124165 A1 | 5/2009 | Weston |
| 2009/0137323 A1 | 5/2009 | Fiegener et al. |
| 2009/0158210 A1 | 6/2009 | Cheng et al. |
| 2009/0204420 A1 | 8/2009 | Ganz |
| 2009/0280905 A1 | 11/2009 | Weisman et al. |
| 2009/0307609 A1 | 12/2009 | Ganz et al. |
| 2009/0318234 A1 | 12/2009 | Christensen et al. |
| 2010/0107214 A1 | 4/2010 | Ganz |
| 2010/0151940 A1 | 6/2010 | Borge |
| 2010/0167623 A1 | 7/2010 | Eyzaguirre et al. |
| 2011/0165939 A1 | 7/2011 | Borst et al. |
| 2012/0157206 A1 | 6/2012 | Crevin et al. |
| 2012/0292854 A1 | 11/2012 | Hamermesh |
| 2012/0295702 A1 | 11/2012 | Otero et al. |
| 2012/0295703 A1 | 11/2012 | Reiche et al. |
| 2012/0295704 A1 | 11/2012 | Reiche et al. |
| 2013/0072296 A1 | 3/2013 | Miyazaki et al. |
| 2013/0130587 A1 | 5/2013 | Cohen et al. |
| 2013/0288563 A1 | 10/2013 | Zheng et al. |
| 2015/0080125 A1 | 3/2015 | Andre et al. |

OTHER PUBLICATIONS

Written Opinion on related PCT Application No. PCT/US2013/073924 from International Searching Authority (KIPO) dated Mar. 11, 2014.
U.S. Appl. No. 15/293,808, filed Oct. 14, 2016, Reiche et al.
U.S. Appl. No. 14/137,054, filed Dec. 20, 2013, Reiche et al., US 2015-0174479 A1, Office Action dated Dec. 30, 2016, Response to Office Action dated May 30, 2017.

INTERACTIVE VIDEO GAME SYSTEM COMPRISING TOYS WITH REWRITABLE MEMORIES

CROSS-REFERENCE TO RELATED APPLICATIONS

The present application is a continuation of U.S. patent application Ser. No. 15/293,808, filed Oct. 14, 2016, which is a continuation U.S. patent application Ser. No. 14/493,215, filed Sep. 22, 2014, now U.S. Pat. No. 9,486,702, which is a continuation of U.S. patent application Ser. No. 13/711,502, filed Dec. 11, 2012, now U.S. Pat. No. 8,858,339, the disclosures of which are incorporated by reference herein.

BACKGROUND OF THE INVENTION

The present invention relates generally to video games and, more particularly, to a video game and a toy used in connection with the video game, where the toy has functionality responsive to events or achievements in the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the present invention provides a video game system comprising a video game console and an object or toy used in connection with the video game console, where the object or toy has a rewritable data storage device, and where the video game console stores information in the rewritable data storage device in response to game play events occurring in a first gaming session. The stored information is subsequently retrieved by the video game console in a second gaming session, and the retrieved information is used to conduct the game play of the second gaming session.

Another aspect of the present invention provides a video game and an object or toy used in connection with the video game, where the object or toy has rewritable data storage, and wherein at least part of that storage is used to store the identity of one or more characters encountered, defeated, or destroyed during game play. The object or toy may then be used in subsequent gaming sessions to allow the user to play with the encountered, defeated or destroyed characters as characters controlled by the user or characters complimentary to the main character controlled by the user during game play.

Another aspect of the invention provides a video game system comprising a gaming platform, such as a game console, computer, mobile device or server, and a toy comprising a rewritable memory, wherein the toy is in communication with the gaming platform. The toy may communicate with the gaming platform either via a peripheral enabling communication between the toy and gaming platform or without the need for a peripheral via direct communication between the toy and the gaming platform. For example, the toy may communicate with a gaming platform or a peripheral to the gaming platform via a wired connection or known wireless communication techniques, such as near-field communication (NFC), radio-frequency identification (RFID), Wi-Fi, or Bluetooth. In various embodiments the toy includes memory, such as RAM or a rewritable RFID tag. The RAM or rewritable RFID tag may initially be empty. When the user engages in game play while the toy is in communication with the gaming platform and a certain game play event occurs, such as encountering, defeating, or destroying another character, data is written from the gaming platform to the toy's memory. The data written to the toy's memory may comprise data identifying a character, such as the encountered, defeated, or destroyed character. The toy may then store the written data and that written data may be used in subsequent gaming sessions. For example, when the toy with written data is in communication with a gaming platform in a subsequent gaming session, the data identifying the defeated enemy may be used to allow the user to play with the acquired character within the game, either as a primary character controlled by the user or as a complementary character to a primary character controlled by the user.

In another aspect of the invention, the video game system comprises a plurality of users each having at least one toy, where the memory of a first user's toy may be written with the identities of characters corresponding to one or more of a second user's toys in response to a game play event. For example, when a character controlled by the first user defeats a character controlled by the second user, the identification of the character controlled by the second user is written to the memory of the first user's toy. The first user's toy may then store the written data and that written data may be used in subsequent gaming sessions by the first user. The memory of the second user's toy may also be written to with information reflecting the game play event, in this case being defeated by the first user. The second user's toy may then store the written data and that written data may be used in subsequent gaming sessions by the second user.

Another aspect of the invention provides a video game system comprising a gaming platform, such as a game console, computer, mobile device or server, and a toy comprising a rewritable memory. In various embodiments the toy memory may be written with identities of one or more characters, wherein a new character or characters are written to and stored on the toy memory based on game play achievements or events. The data representing or identifying characters written to and stored on the toy memory may be accessed and utilized in subsequent game sessions by the user.

In another aspect of the invention, the toy may be written with one or more characteristics, powers, and/or attributes of one or more characters, wherein the characteristics, powers, and/or attributes are written to and stored on the toy memory based on game play achievements or events. The data representing or identifying the characteristics, powers, and/or attributes may be accessed and utilized in subsequent game sessions by the user.

In another aspect of the invention, the toy comprises a visual display and/or audio output reflecting or corresponding to the character or characters whose identification is stored in the memory of the toy, or the characteristics, powers, and/or attributes of characters stored in the memory of the toy. In some embodiments, the toy may include a dynamic display mechanism for displaying an image of the character whose identification is stored in the memory of the toy, or an image of the characteristics, powers, and/or attributes of characters stored in the memory of the toy. The display may be activated both when the toy is in communication with the gaming platform and/or when the toy is not in communication with the gaming platform.

These and other aspects of the invention are more fully comprehended upon review of this disclosure.

DETAILED DESCRIPTION

Figure 1A:
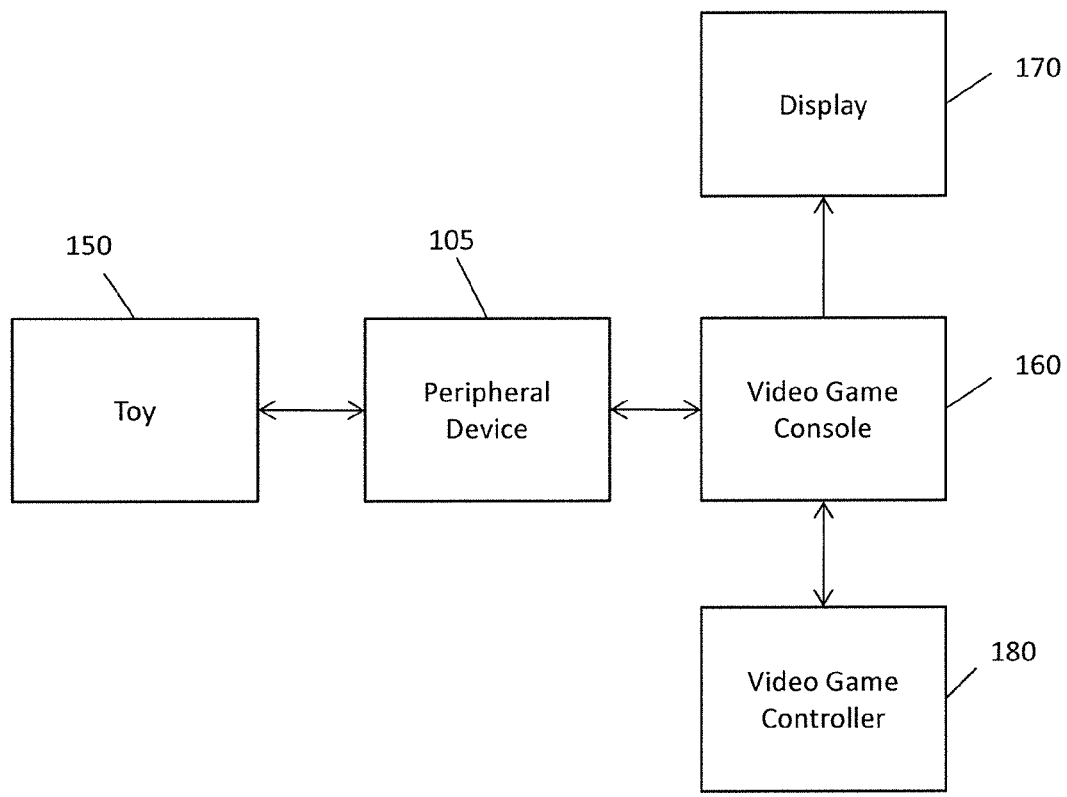
FIG. 1A is a block diagram illustrating an example of a video game system in accordance with aspects of the present invention.

FIG. 1A is a block diagram illustrating an example of a video game system in accordance with aspects of the present invention. Referring to FIG. 1A, the video game system includes a video game device in the form of a video game console 160 with a processor for executing program instructions providing for game play and associated circuitry, a user input device such as a video game controller 180, a display device 170, a peripheral device 105 and a toy 150. The toy 150 includes communication circuitry and a rewriteable data storage component (not shown in FIG. 1A), for example such as RAM or a rewritable RFID tag that stores data, for example, reflecting or writable to reflect information of a character or a plurality of characters within the game executed on game console 160. In some embodiments the information of the character is an identification of a character. In some embodiments information of the character includes information as to the characteristics, for example capabilities, of the character.

Although a video game console 160 is depicted, it is understood that in other embodiments the video game may be operated on other video game devices, for example a personal computer, mobile device (e.g. portable gaming device, cell phone, portable computer, tablet computer) or on a remote server or any other gaming platform alone or in combination with other devices in a system. Further, although FIG. 1A depicts a display 170 and video game controller 180 as separate components, it is understood that the in other embodiments one or more of these components may be integrated into a single or combination of devices.

In alternative embodiments, a peripheral device 105 is not needed. For example, in certain embodiments, toy 150 may communicate directly with the video game console 160. In still other embodiments, the video game controller 180 or display 170 may facilitate communication between the toy 150 and the video game console 160.

Figure 1B:
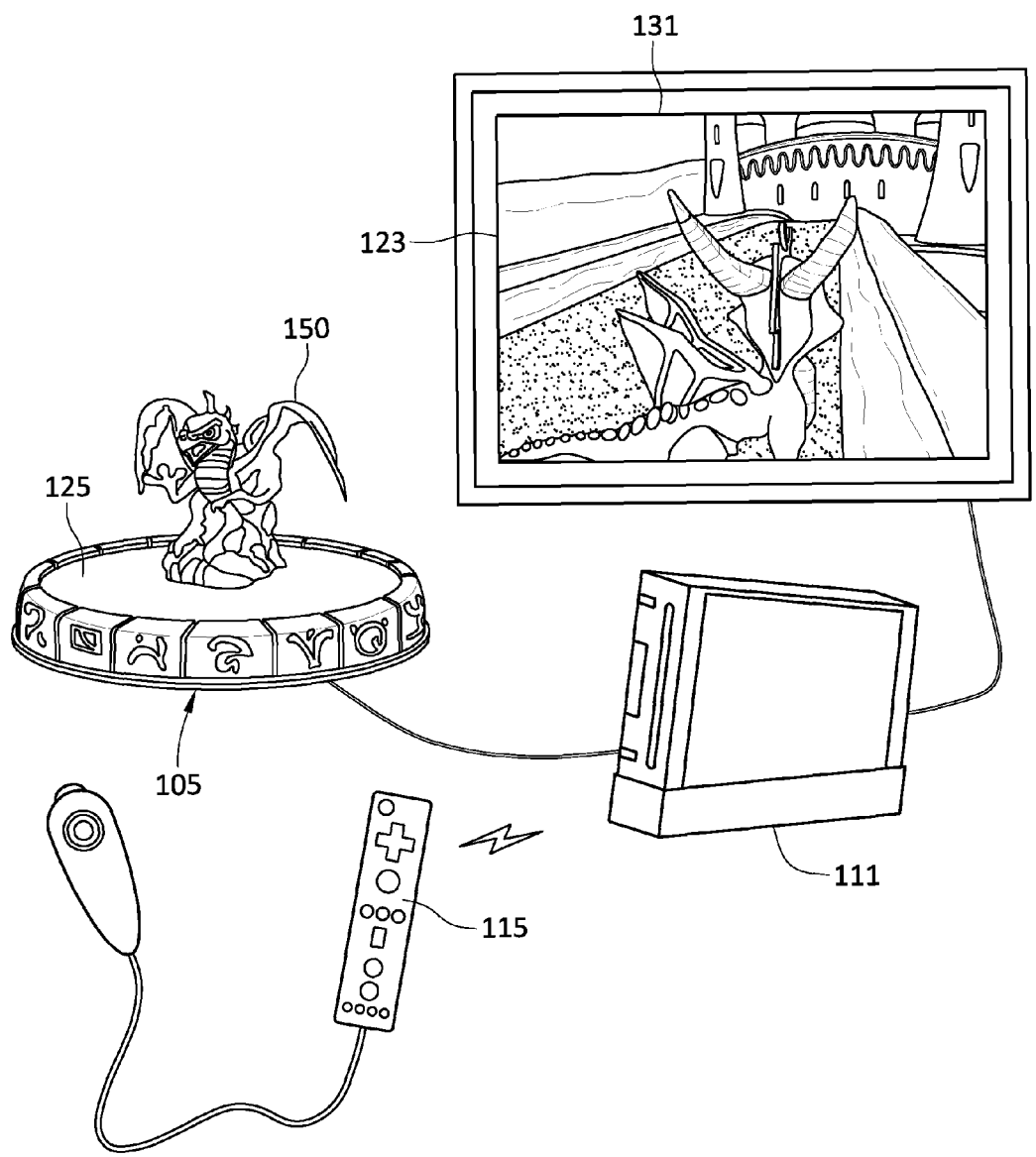
FIG. 1B illustrates an example of a video game system in accordance with aspects of the invention.

FIG. 1B illustrates an example of a video game system in accordance with aspects of the invention. The video game system includes a game console 111 with a processor for executing program instructions providing for game play and associated circuitry, user input devices such as a game controller 115, a display device 123 for displaying game action, a peripheral device 105, and a toy 150, which in various embodiments includes a rewritable memory. The peripheral device 105 may also provide the toy 150 with electrical power, for example through inductive couplings, although in some embodiments, the toy 150 may have its own source of electrical power, for example, a battery.

The peripheral device 105 may also provide the capability to read and write information to the toy 150. The processor, responsive to inputs from the user input devices and the peripheral device 105, generally commands display on the display device 123 of game characters in and interacting with a virtual world of game play and possibly each other. In addition, the processor, responsive to inputs from the peripheral device 105, for example inputs based on information read from the toy, may be used to add characters and objects to the virtual world, with the characters able to manipulate the added objects and move about the virtual world. For example, the processor may include characters in game play based on inputs from the peripheral device 105, and the processor may control actions and activities of game characters based on inputs from the user input devices. Furthermore, the processor, responsive to inputs from the peripheral device 105, may be used to change the characteristics, powers, and/or attributes of characters and objects in the virtual world. For example, a character in game play may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from the peripheral device 105.

The instructions providing for game play is generally stored on removable media, for example, an optical disk. Accordingly, the game console may include an optical drive, for example, a DVD-ROM, CD-ROM or Blu-ray drive, for reading the instructions for game play. In some embodiments, the removable media may be a flash memory data storage device. In some embodiments, the game console may be a personal computer, including similar internal circuitry as herein described, as well as, for example, a built-in display and built-in user input devices, such as a keyboard and a touch pad or mouse. In other embodiments, the instructions providing for game play may be stored in a remote server that is accessed by a computer or mobile device. In yet other embodiments, the instructions providing for game play may be stored on the local memory of the game console.

The display device 123 is generally coupled to the gaming platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 131 of the display device 123 displays video images of game play, generally as commanded by the processor or other associated circuitry of the gaming platform. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device 105, in some embodiments and as shown in FIG. 1B, has a substantially flat upper surface 125 for placement of one or more toys thereon. The game player generally places game toys, for example, toy 150 as shown in FIG. 1B, on the flat surface 125 of the peripheral device during game play.

Each toy 150 may include machine-readable/writable information, for example, memory or a radio frequency identification (RFID) tag. The machine-readable/writable information may be sensed, read, and/or written by the peripheral device 105 and/or the gaming device, directly or indirectly to the toy memory and/or tag. The machine-readable/writable information may include a numeric identifier. In some embodiments, the numeric identifier specifies a character from the video game that the user encountered or defeated while playing the video game. In other embodiments, the numeric identifier may specify other video game objects, such as accessories or weapons. In further embodiments, the machine-readable/writable information may also include game-related information including characteristics, powers, and/or attributes of characters that the user encountered or defeated while playing the video game, or information relating to game play achievements or events.

In some embodiments, when a toy memory or tag is read by the peripheral device 105, the peripheral device 105 provides the gaming platform an indication of the identifier and status information of the toy, and generally the processor of the gaming platform commands display of a corresponding game character or video game object, or otherwise makes the corresponding game character or video game object available in game play. In other embodiments, game-related information stored on the toy may be read and used by the processor to conduct a game play sequence. For example, characteristics, powers, and/or abilities of previously-defeated characters may be read and used by the processor to alter or enhance the user's character. In some embodiments, information relating to the user's character may be stored in a toy or object different from the toy or object that stores the information relating to the previously-encountered or defeated characters.

The toy 150 may include a rewritable memory. In various embodiments the rewriteable memory includes information of a game character. The user may place the toy 150 on the peripheral 105, and in some embodiments, the user may be allowed to place multiple toys on the peripheral 105. With the toy on the peripheral, the peripheral may read the information of the game character, and provide the information to the console 111, with the console inserting the character into game play. When a user plays the game on console 111, with the user controlling the character, for example by way of manipulation of a user input device, the user may encounter various challenges, such as enemies to be defeated by the character in a battle. If the user completes the challenge, for example, by controlling the character so as to destroy or beat the enemy in a battle, information of the defeated enemy character is written from the console 111 to the toy 150 via peripheral 105. In some embodiments, the information is data representing the identification of the defeated enemy character. In some embodiments, the information representing the defeated enemy character is written in place of information of the character played by the user. In some embodiments, the data representing the information of the defeated enemy character is written in addition to information of the character played by the user. In some embodiments, the information of the defeated enemy character is information identifying the defeated enemy character.

In subsequent gaming sessions, the user may place toy 150 on peripheral 105 and the data identifying the enemy character defeated in the prior gaming session may be transmitted to the console 111 via the peripheral 105. For example using a user input device, the user may then play with or control the enemy character identified in the toy 150 memory in the video game, or have that enemy character play alongside another character controlled by the user. In some embodiments, the information relating to the character controlled by the user is stored in a separate toy or object.

In some embodiments, the toy object 150 may only be capable of storing character identification information for a single character. In alternative embodiments, the toy object 150 may be capable of storing multiple character identifications.

Figure 2A:
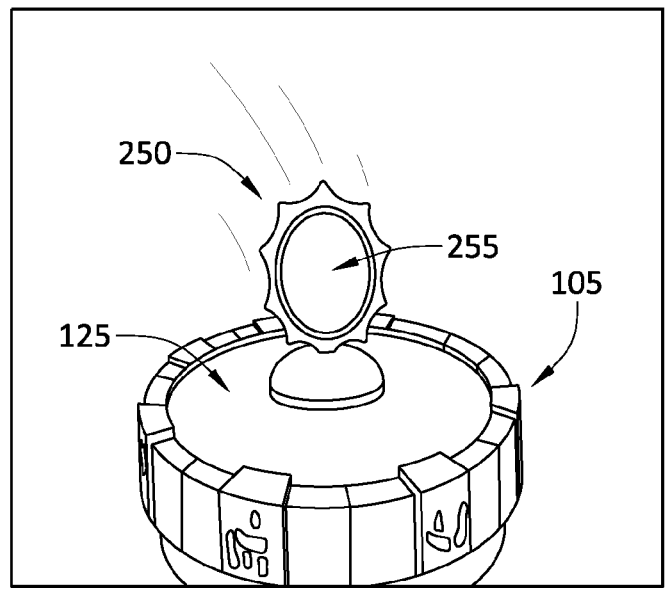
FIG. 2A illustrates an example of a model of a toy object in accordance with embodiments of the invention.
Figure 2B:
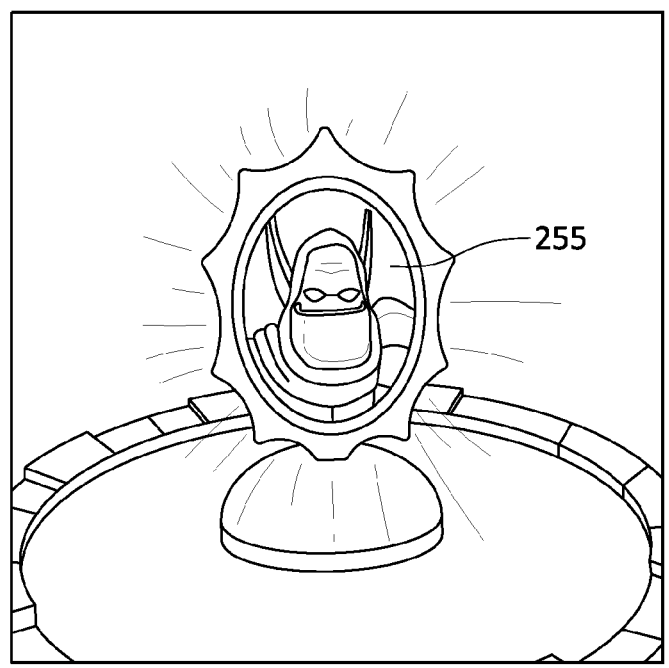
FIG. 2B illustrates an example of a model of a toy object in accordance with embodiments of the invention.

FIGS. 2A and 2B illustrate an embodiment of a toy 250. The toy 250 is similar to the toy 150, for example including rewritable memory and communication circuitry. As illustrated, the toy is on a top surface 125 of a peripheral device 105. In various embodiments the toy 250 may be used instead of or in addition to the toy 150.

As illustrated in FIGS. 2A and 2B, the toy 250 may also include a display device 255. The display of the display device 255 may also be altered to depict an image of a defeated character whose identification data was written to the memory on toy 250. In some embodiments, image information of the defeated character may be written from the console 111 into memory of the toy 250. In other embodiments, the toy 250 may store preloaded information of images corresponding to various enemy characters to be encountered. The display may then be altered to depict an image of the defeated enemy character selected from the preloaded images, for example as commanded by the console, or based on information written to memory of the toy as commanded by the console.

The display device may identify or depict the character or other game object identified by the numeric identifier stored in the toy memory or RFID tag. For example, if a user plays the video game and defeats an enemy character, a numeric identifier representing that enemy character may be written from the gaming device to the toy 150 (directly or via a peripheral) and stored on the toy memory or tag. The display 163 on the toy 150 may then be activated or modified to depict or reflect the identity of the character represented by the numeric identifier stored in the toy memory or tag. In some embodiments, the image of the character or other game object may be written from the console 111 into a memory on the toy 250. In other embodiments, the toy 250 may store preloaded images corresponding to various characters or other game objects to be encountered. In yet other embodiments, and as discussed in the context of FIG. 3 below, the image of the character or game objects may be stored in a server accessible by console 111 through one or more networks. In some embodiments, the display 255 may be activated or modified to depict or reflect other game-related information stored on the toy 250. For example, the display 255 may display icons representing characteristics, powers, and/or abilities acquired from previously-encountered or defeated characters.

The display 255 may comprise an LCD, electrophoretic ink, LED, or other known display mechanisms. The toy 250 may further include a processor or control circuitry that is in communication with the console directly or indirectly (for example via the peripheral). The processor of the gaming platform may further command the toy to produce display effects.

The toy 150 or 250 may, in some embodiments, comprise an audio output, such as a speaker, outputting audio information reflecting or corresponding to the character or characters whose identification is stored in the memory of the toy, or the characteristics, powers, and/or attributes of characters stored in the memory of the toy. In some embodiments, the audio information may comprise words or phrases spoken in the voice of the character or characters stored in the memory of the toy. In some embodiments, the audio information may comprise sounds corresponding to the characteristics, powers, and/or attributes of characters stored in the memory of the toy. For example, if the character whose information stored in the memory of the toy has characteristics, powers, and/or attributes relating to thunder, the audio information may comprise thunder sound effects.

In some embodiments, the audio information may be written from the console 111 into memory of the toy 150 or 250. In some embodiments, the audio information may be completely written from the console 111 into memory of the toy 150 or 250 before being output by the audio output. In some embodiments, the audio information may be streamed, or output while the being written from the console 111 into the memory of the toy 150 or 250. In other embodiments, the toy 150 or 250 may store preloaded audio information corresponding to various enemy characters to be encountered. The toy 150 or 250 may then output audio information corresponding to a captured character by selecting from the preloaded audio information, for example as commanded by the console, or based on information written to memory of the toy as commanded by the console. In some embodiments the toy outputs audio information by a processor or other circuitry of the toy selecting from the preloaded audio information, and driving a speaker or other audio generation device of the toy.

The audio output may be activated both when the toy is in communication with the gaming platform and/or when the toy is not in communication with the gaming platform. In some embodiments, when the toy is in communication with the gaming platform, the audio output may receive electrical power from the gaming platform, for example through inductive coupling, as discussed above. In some embodiments, the audio output may receive electrical power from a source within the toy itself, for example, a battery.

Figure 3:
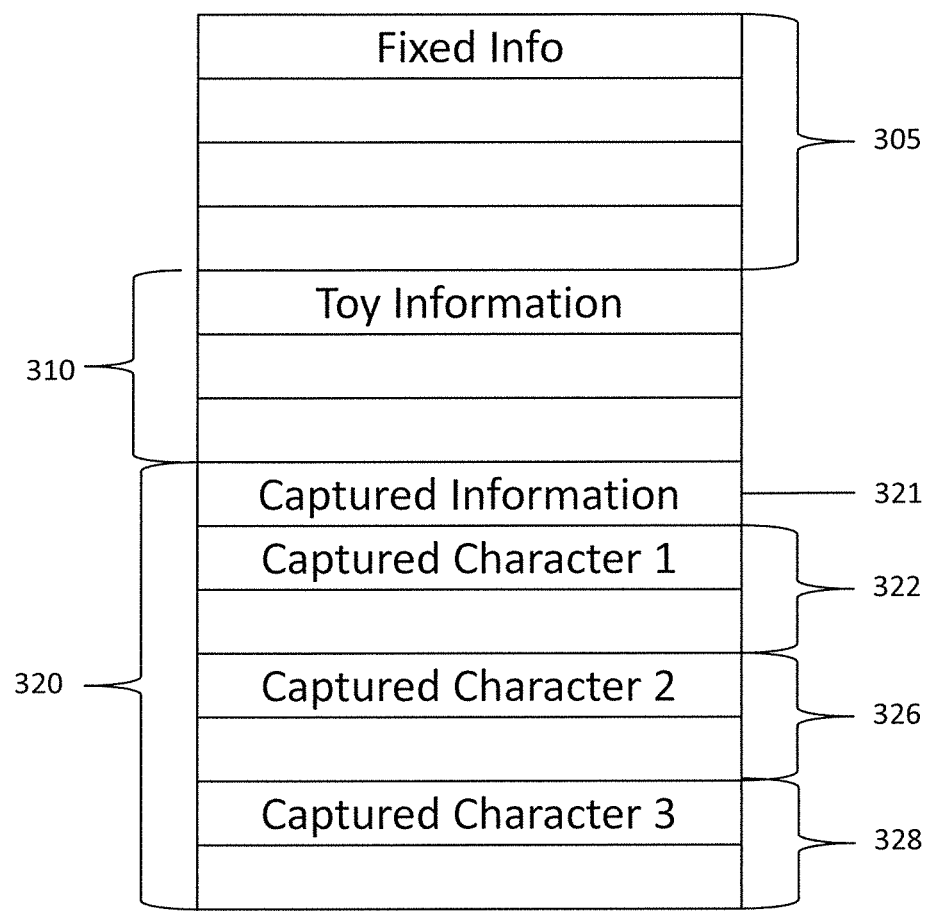
FIG. 3 illustrates an example of a game system in accordance with embodiments of the invention.

FIG. 3 is a diagram of an example data structure for storing character information in memory of a toy in accordance with aspects of the invention. Information about characters such as their identification, characteristics and/or status, may be stored at various locations in the data structure. Although various fields of the data structure are shown in particular locations in FIG. 3, the data structure may use a different arrangement of the fields, and may only include subsets of fields or information of the fields.

The data structure includes an area of fixed information 305. The fixed information may include information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or check sum. The fixed information is generally written when the toy is created and not thereafter changed.

The data structure of FIG. 3 also includes a toy data area 310 and a captured data area 320. In some embodiments only certain toys, or game characters representative of the toys, may be used for capturing characters. In some embodiments a toy, such as toy 150 and/or 250, may contain both the toy data area and the captured data area. In some embodiments a toy may contain only a toy data area or a captured data area, but not both. In some embodiments some toys may contain both data areas, some toys may contain only the toy data area, and some toys may contain only the captured data area. In some embodiments toys may include both the toy data are and the captured data area, but flags, in memory of the toy for example, may indicate for which areas data may be written, or not written. The toy data area contains fields for values representing information about a game play object or character represented by the toy. In some embodiments the information about the game play object or character that may change during game play. For example, if a character is represented by the toy, fields that store score values, experience levels, or other information of the character may change frequently during game play.

A captured character may be another game character encountered or defeated in battle, whose identity of characteristics may be "captured" by a game character during game play. In some embodiments the captured data area includes fields for information of a single captured character, and in some embodiments, such as illustrated in FIG. 3, the captured data area includes fields for information for a plurality of captured characters. In some embodiments the information for a captured character is an identifier for the captured character. In some embodiments the information for the captured character may change during game play. For example, fields that store score values, experience levels, or other information of the captured character may change during game play, as a result of game play in which a user utilizes the captured character or otherwise. In some embodiments the information for the captured character includes information of an image of the captured character and/or information as to capabilities, characteristics or other information regarding the captured character. In some embodiments the information of the image is in the form of a bitmap. In some embodiments, the information for the captured character includes audio information reflecting or corresponding to the captured character or characteristics, powers, and/or attributes of the captured character.

As illustrated in FIG. 3, the captured data area includes a header field 321 for captured character information. Information of the header field may indicate, for example, the number of captured characters for which information is stored. The captured data area also includes first captured character information fields 322, second captured character information fields 326, and third captured character information fields 328.

Figure 4:
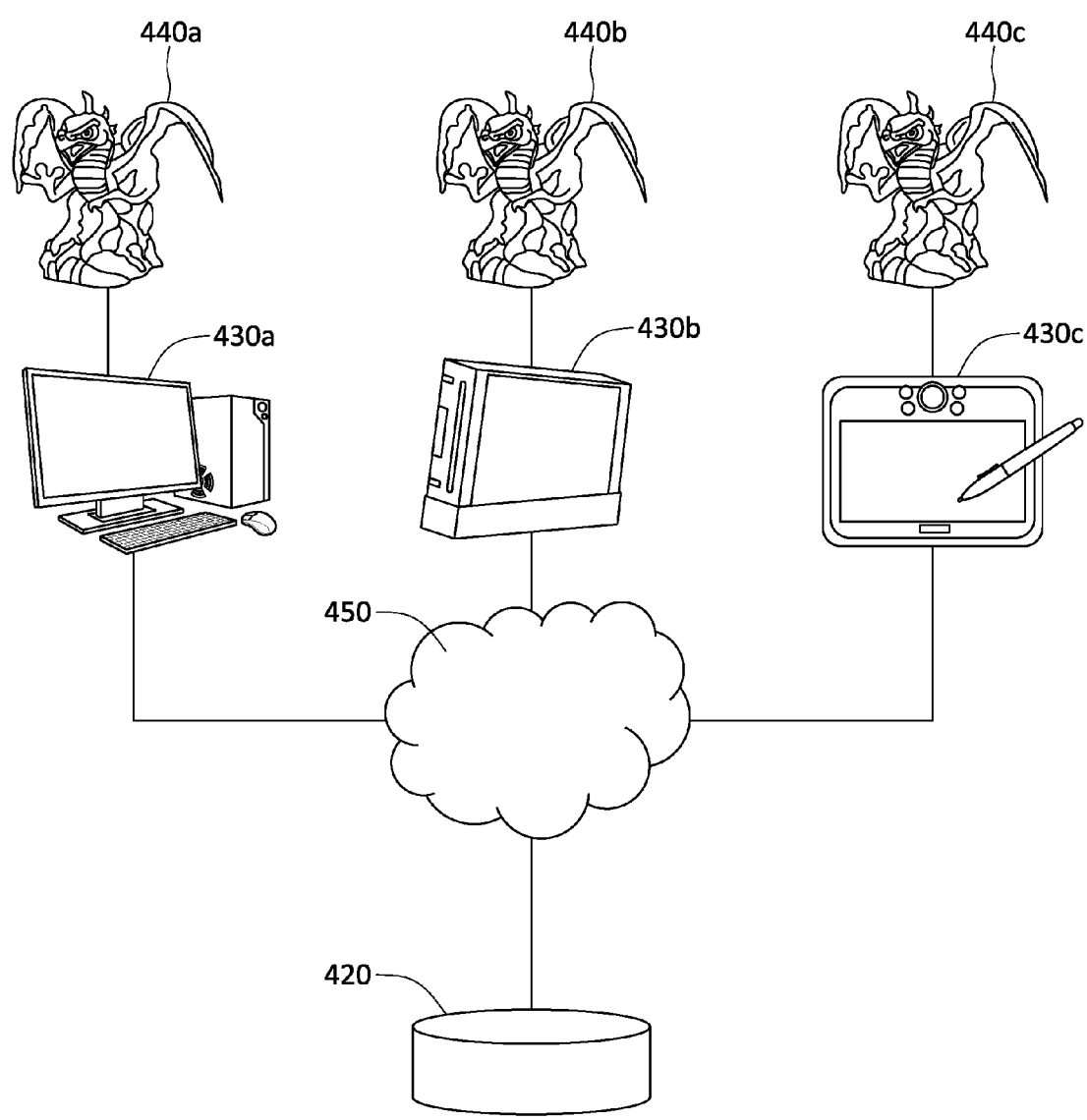
FIG. 4 is a block diagram illustrating a video game console in accordance with aspects of the invention.

Referring to FIG. 4, an embodiment of a system in accordance with aspects of the present invention includes one or more gaming platforms 430a-c each with a processor for executing program instructions providing for game play and associated circuitry (such as I/O devices and display devices, not shown) connected to a server 420 (or plurality of servers) through a combination one of more wired or wireless networks 450. The gaming platforms 430 may be any of a variety of processing devices capable of executing a video game program and communicating with a remote server, such as a traditional video game console (e.g. PlayStation, Xbox, Wii, WiiU), portable game console (e.g. Nintendo NDS, PlayStation Portable), a personal computer, a laptop, a mobile computing device (e.g. iPad or other tablet), or other mobile device (e.g. cell phone, iPhone, Blackberry, Android operated phone, MP3 player, portable media player). The platforms provide video images to a display. The platform may also provide audio outputs.

In one embodiment, the gaming platforms 430a-c are each able to uniquely identify one or more toys 440a-c. The identification of toys 440a-c may be performed either through a direct or indirect coupling between toys 440a-c and the gaming platforms 430a-c. For example, the coupling may be through a wired connection (e.g. USB), a wireless coupling (e.g. NFC, Bluetooth, or Wi-Fi), or other known object recognition methods, such as recognizing toys 440a-c by capturing a visual image of the toy and determining identity, or by scanning a bar code or other code printed on toys 440a-c or on a separate medium associated with toys 440a-c. In other embodiments, the gaming platforms 430a-c are able to identify toys 440a-c via a peripheral coupled to platforms 430a-c.

In some embodiments, once a gaming platform 430a-c recognizes and identifies toys 440a-c, a virtual representation of toys 440a-c is presented in a game operating on gaming platform 430a-c. The user may control the virtual representation of the toys 440a-c within the game. The virtual representation of toys 440a-c may have an identity and/or one or more characteristics, powers, and/or attributes associated with it, such as health, strength, power, speed, wealth, shield, weapons, special abilities, spells, or achievement level, for example. As the user plays the game utilizing, at least in part, the virtual representation of the toys 440a-c, the identity and/or one or more characteristics, powers, and/or attributes associated with toys 440a-c may be altered.

For example, when a user, by way of utilization of the virtual representation of the toy, encounters or defeats an enemy character, information of the encountered or defeated character may be stored in the memory of the toy or server 420. In some embodiments the information of the encountered or defeated character comprises the identity of the encountered or defeated character. In some embodiments the information of the encountered or defeated character additionally comprises characteristics of the encountered or defeated character. In some embodiments a game console may command storage of the information of the defeated or encountered character, for example as requested by the user. As another example, as the user progresses through different challenges within the game using the virtual representation of toys 440a-c, the user may effectively acquire use of characteristics, powers, and/or attributes from defeated characters, or discover and collect various virtual items, such as a weapon, usable by the virtual representation of toy 440a-c within the virtual world. In some embodiments, at the completion of a particular gaming session, or periodically throughout a gaming session, the changes in identity and/or characteristics, powers, and/or attributes to the virtual representation of toy 440a-c are stored by gaming platform 430a-c to server 420. The identity and/or characteristics, powers, and/or attributes data is stored on said server 420, for example via a relational database, and is associated with the particular toy 340a-c for subsequent access by the user utilizing toy 440a-c in subsequent gaming sessions either on the same or different gaming platforms. Accordingly, the updated data pertaining to the one or more characteristics and/or attributes associated with the virtual representation of toy 440a-c may persist across platforms having access to server 420. In some embodiments, these attributes may also be stored elsewhere, such as a memory associated with gaming platform 430a-c or a memory associated with toy 440a-c.

Still in reference to FIG. 4, in some embodiments, the video game may be played in a multiplayer mode comprising a plurality of users, each using one or more toys 440a-c substantially in the manner described above, playing the video game locally, over a network, or a combination thereof. Network-based multiplayer games may be facilitated through a centralized server, such as server 420, or through peer-to-peer connections.

In multiplayer mode, the memories of a first user's and a second user's toys may be written in connection with game play events involving characters associated with the first user's and second user's toys. For example, when a character controlled by the first user defeats a character controlled by the second user, the first user's game console may write, through the first user's peripheral device in some embodiments, an identification of the character controlled by the second user to the memory of one of the first user's toys. The first user's toy may then store the written data in the toy's memory and that written data may be used in subsequent gaming sessions by the first user. For example, in some embodiments, the first user may then play with the second user's character identified in the first user's toy memory, or have the second user's character play alongside another character controlled by the first user. In other embodiments, one or more characteristics, powers, and/or attributes of the second user's character may be written to the first user's toy, thereby allowing the first user's character to acquire said characteristics, powers, and/or attributes. In some embodiments, the benefits of defeating the second user's character may be temporary. For example, after a predetermined amount of time (e.g., 30 seconds, 5 minutes, 1 hour, 1 day, etc.), the first user will automatically lose the ability to play with the second user's character or the enhanced characteristics, powers, and/or attributes gained from defeating the second user's character.

Still referring to the multiplayer embodiment, the second user's game console may also write through the second user's peripheral device information reflecting the game play event to the memory of one of the second user's toy. For example, following a defeat at the hands of the first user, game-related information reflecting this defeat may be written to the second user's toy. The second user's toy may then store the written data in the toy's memory and that written data may be used in subsequent gaming sessions by the second user. For example, in some embodiments, characteristics, powers, and/or attributes of the second user's character may be altered or decreased to reflect that these characteristics, powers, and/or attributes have been acquired by the first user's character. In some embodiments, and in accordance with the discussion above, these effects are temporary.

Figure 5:
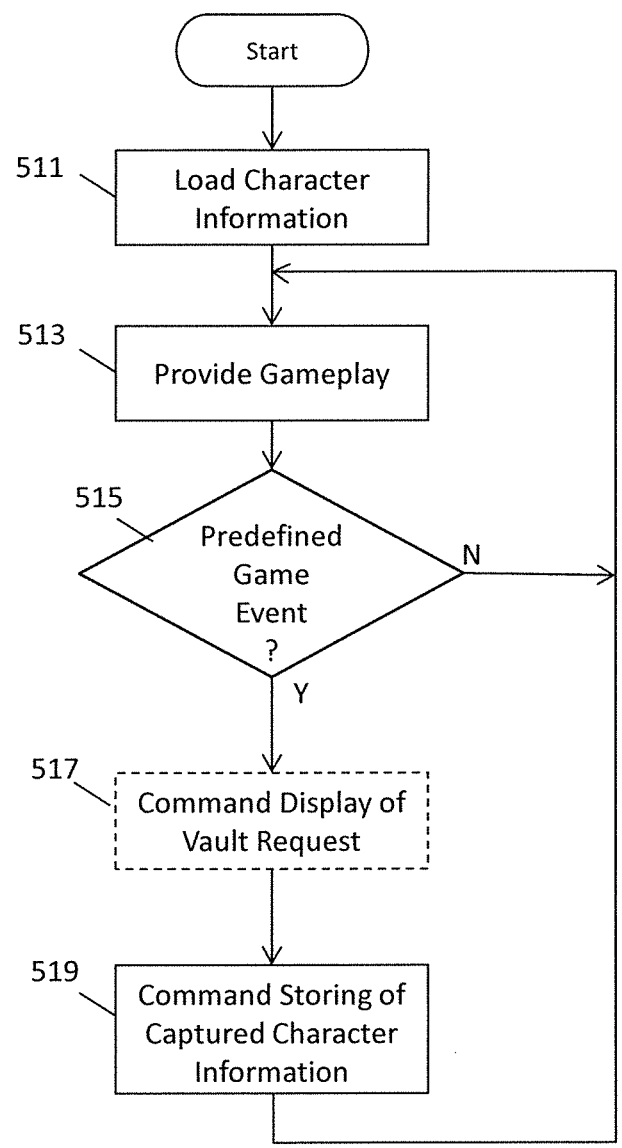
FIG. 5 illustrates an example of a peripheral device in accordance with embodiments of the invention.

FIG. 5 is a flow diagram of a process including storing of captured characters. In some embodiments the process of FIG. 5 is performed by the system of FIG. 1A or 1B. In some embodiments the process is performed by a processor programmed by program instructions for example a processor of a game device such as a game console.

In block 511 the process loads character information. The character information may be stored in memory of a toy, and read from the memory of the toy and stored in memory of the game device. In block 513 the process provides for game play of a video game. In most embodiments providing for game play includes commanding presentation of at least portions of a virtual world of game play on a display, including a game character based on the character information and possibly other game characters, and modifying game states based on video game play, including inputs received from a user input device.

In block 515 the process determines if a predefined game event has occurred. In some embodiments the predefined game event is defeat of an opposing game character by the game character. In some embodiments the opposing game character is a game character controlled by another user. In some embodiments the opposing game character is a character controlled by game program instructions of the video game.

If the predefined game event has occurred the process proceeds to optional block 517 or block 519, otherwise the process returns to block 513 and continues to provide for game play.

In optional block 517 the process commands display of an indication to the user regarding storage of information of the opposing game character. In some embodiments, for example, information of the opposing character may be stored in a separate toy, and the indication may effectively ask the user to communicatively couple the separate toy to the game. In some embodiments the indication may be a request to the user to indicate whether storage of the information of the opposing character is desired. In some embodiments the indication may indicate that information of the opposing character is being stored. As operations of block 517 are optional, however, in some embodiments the process skips the operations of block 517, and instead continues to block 519.

In block 519 the process commands storage of the opposing game character information. In some embodiments the process commands storage of the opposing game character information on a server. In some embodiments the process commands storage of the opposing game character information in memory of a toy. In some embodiments the opposing game character information is an identifier identifying the opposing game character.

Figure 6:
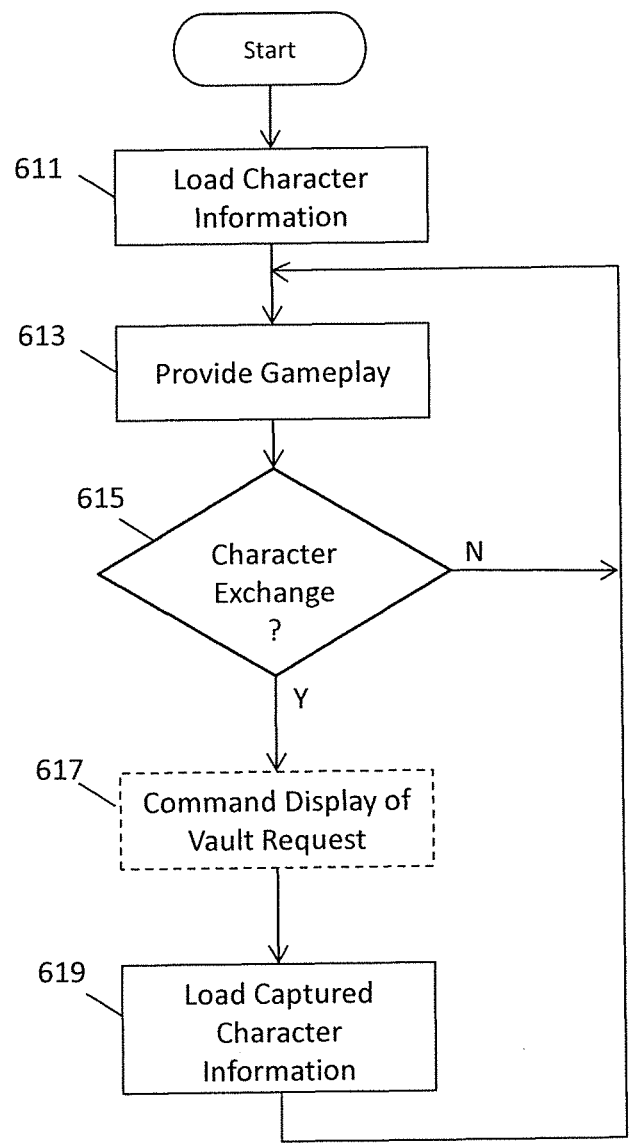
FIG. 6 is a flowchart of a process for communication with toys in accordance with aspects of the invention.

FIG. 6 is a flow diagram of a process including loading captured character information for use during game play. In some embodiments the process of FIG. 6 is performed by the system of FIG. 1A or 1B. In some embodiments the process is performed by a processor programmed by program instructions for example a processor of a game device such as a game console.

In block 611 the process loads character information. The character information may be stored in memory of a toy, and read from the memory of the toy and stored in memory of the game device. In block 613 the process provides for game play of a video game. In most embodiments providing for game play includes commanding presentation of at least portions of a virtual world of game play on a display, including a game character based on the character information and possibly other game characters, and modifying game states based on video game play, including inputs received from a user input device.

In block 615 the process determines if a user has requested a change in characters to a captured character, for example by operating the user input device or by placement of a particular toy on a peripheral device. If not, the process continues providing game play in block 613. If so, the process continues to optional block 617 or block 619.

In optional block 617 the process commands display of an indication to the user as to actions to take in order to effect a change in characters. For example, the process may command display of an indication for the user to place a particular toy on a peripheral device of a game system.

In block 619 the process loads the information for the captured character. In some embodiments the process reads the information stored in memory of a toy. in some embodiments the process downloads the information from a server. In some embodiments the information identifies the captured character, and the process determines other information regarding the captured character from memory of the game console. The process thereafter returns to block 613 and provides game play, with the user using the user input device to control the captured character. In some embodiments the captured character may be utilized as other game characters are utilized, for example the game character discussed with respect to operations of block 613. In most embodiments attributes of such characters may change during game play. For example, a value indicative of health of the character may increase or decrease, or the character may increase or decrease in levels, or the character be upgraded in some manner. In such embodiments, revised information of the captured character may be written to memory of the toy, or provided to a server.

Figure 7:
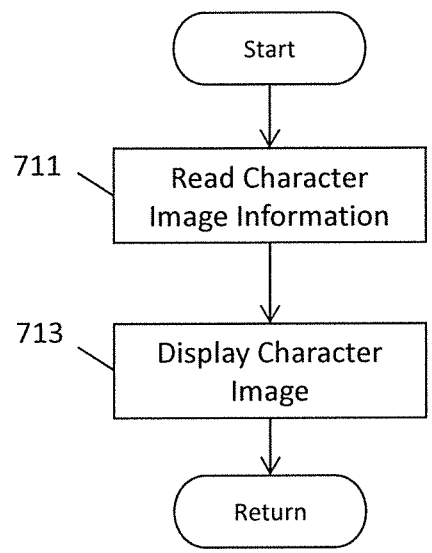
FIG. 7 is a flowchart of a process for communicating commands with a toy in accordance with aspects of the invention.

FIG. 7 is a flow diagram of a process for displaying character information on a toy. In some embodiments the character information is an image of the character. In some embodiments the image is of a captured character. In some embodiments the character information is images of a plurality of captured characters. In some embodiments the process is performed by a toy, for example the toy of FIGS. 2A and 2B, and in some embodiments the process is performed by circuitry of the toy, and the circuitry may be in the form of a programmable processor in some embodiments.

In block 711 the process reads character information. In some embodiments the character information is read from memory of the toy. In some embodiments the character information is image information, and in some embodiments the image information is a bit map of an image.

In block 713 the process commands display or displays the character information on a display of the toy. For example, in some embodiments a view of a face of the character is displayed.

Figure 8:
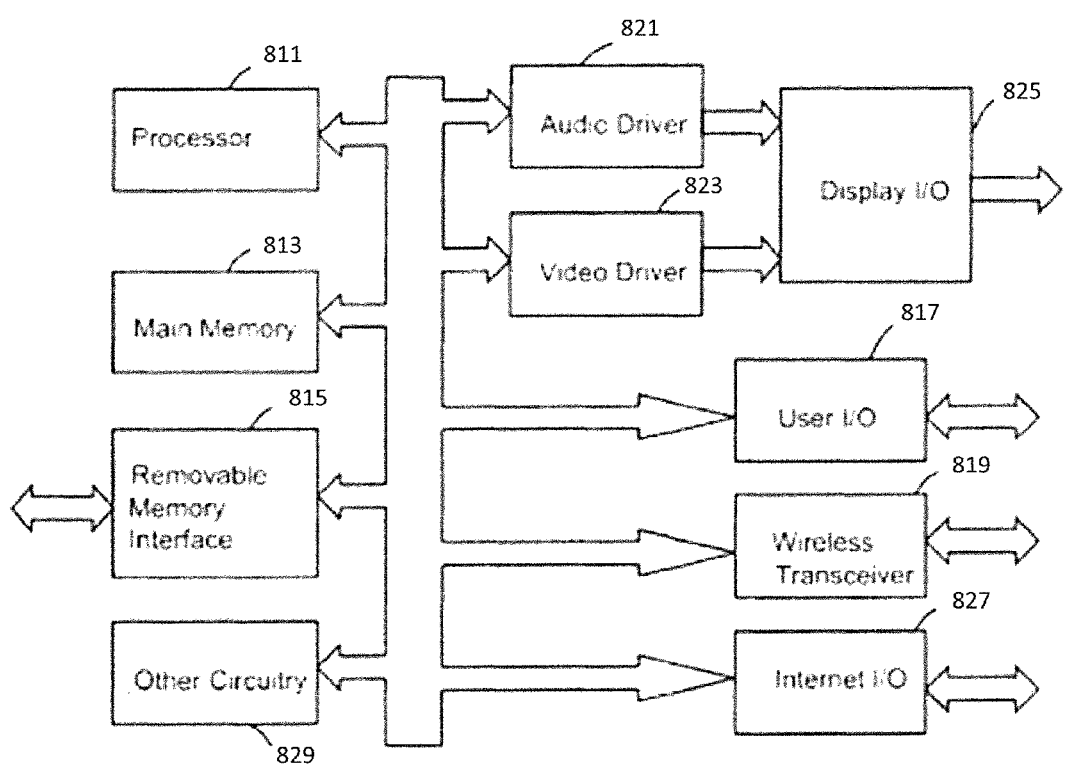
FIG. 8 is a flowchart of a process for communication with a video game peripheral in accordance with aspects of the invention.

FIG. 8 is an example of a block diagram of a processor and associated circuitry, for example, for a game device, useful in accordance with aspects of the invention. As shown in FIG. 8 a processor 811 is connected to other components via a bus. The other components include a main memory 813 and a removable memory interface 815 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 821 and a video driver 823. The audio driver produces sound signals and the video driver produces image signals. The sound signals and image signals are transmitted from the game console via a display I/O device 825. The display I/O device generally supplies the sound and image signals to a display device external to the game console. Sound signals may also be supplied to a peripheral device such as a toy detection device.

The processor may also be coupled to a user I/O device 817, a wireless transceiver 819, an Internet I/O device 827, and other circuitry 829. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 9:
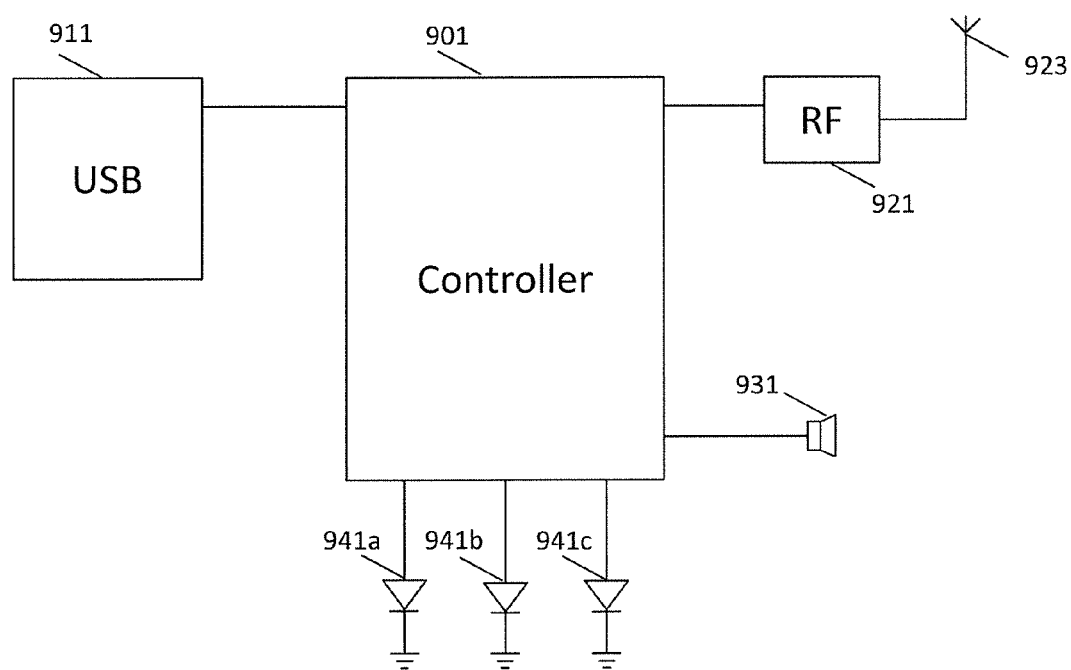
FIG. 9 is a flowchart of a process for executing commands associated with game play events in accordance with aspects of the invention.

FIG. 9 is a block diagram of a video game peripheral in accordance with aspects of the invention. The peripheral may be used in some embodiments to detect toys placed thereon. The peripheral may be used to provide information from the toy to a game console and, in some embodiments, from the game console to the toy or from one toy to another toy. Accordingly, the peripheral includes a universal serial bus (USB) interface 911 to communicate with the game console. In some embodiments, the peripheral may use a different interface, for example, a wireless interface for communication with the game console. The information communicated between the peripheral and the game console may be encrypted, and the information read from or written to the toy by the peripheral may also be encrypted.

The peripheral also includes a radio-frequency (RF) interface 921 to communicate with toys. In many embodiments, the radio-frequency interface is a radio frequency identification (RFID) interface. In other embodiments, the peripheral may include a different interface for communicating with toys, such as an optical interface or a wired interface.

The peripheral includes a controller 901 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 931. The loudspeaker provides audio signaling to game players and the signaling may relate to a particular toy present on the peripheral. In some embodiments, the peripheral includes visual indicators such as light-emitting diodes 941a-c. The diodes may, for example, be illuminated with intensities or colors according to characteristics of the toy or to signal performance in the video game of characters associated with toys on the peripheral. Both the loudspeaker and visual indicators are coupled to the controller. The controller signals the loudspeaker and visual indicators to operate according to commands received via the USB interface.

Figure 10:
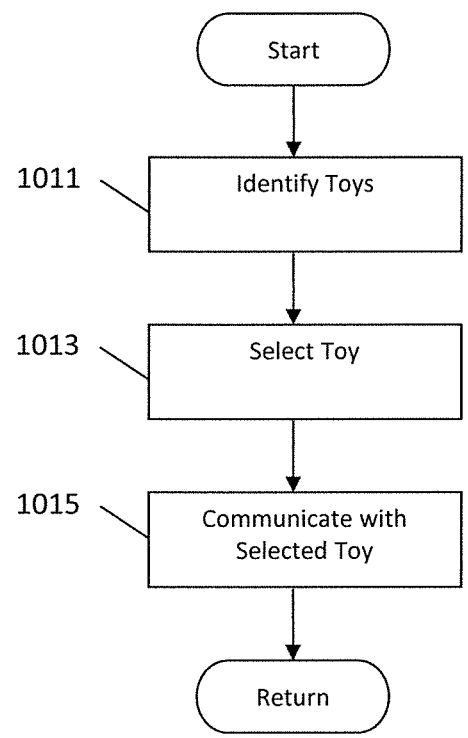
FIG. 10 is a flowchart of a process for conducting game play in accordance with aspects of the invention.

FIG. 10 is a flowchart of a process for communication with toys in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 1011, the process identifies toys in a defined region. For example, the process may determine what toys are on the surface of a video game peripheral as shown in FIG. 9. In various embodiments, the toys may be identified by RFID, barcodes, or optical recognition. In one embodiment, identification of toys includes a video game peripheral reading identifiers of the toys and supplying the identifiers to a video gaming platform. In one embodiment, the toy having rewritable memory or identification tag to store the identity of characters encountered or defeated during game play, the identity of other video game objects, or other game-related information may include a separate memory location or tag for a numeric identification code identifying the toy object as one having rewritable memory or tag to store new character identifications, video game objects identifications, or game-related data.

In block 1013, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 1015, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Figure 11:
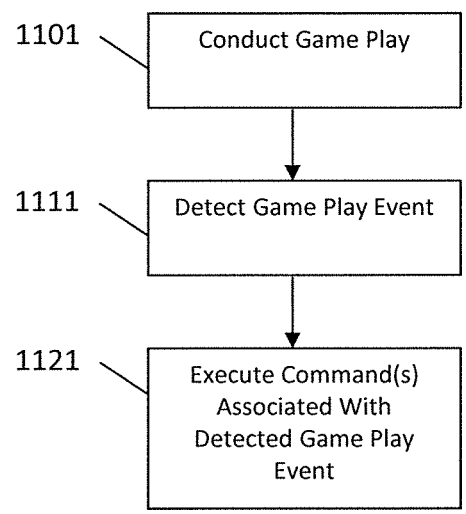
FIG. 11 is a flowchart of a process for executing commands associated with game play events in accordance with aspects of the invention.

FIG. 11 is a flowchart of a process for executing commands associated with game play events in accordance with aspects of the invention. In block 1101, the process conducts game play. In some embodiments the process may conduct game play by way of a processor of a video game platform executing instructions to conduct a game play sequence based in part on inputs by a player. In block 1111, the process detects a game play event. For example, in some embodiments a video game platform may include a data structure including a plurality of predetermined game play events, with the processor of the video game platform determining if any of the predetermined events has occurred. Game play events may include any occurrences or achievements within the game, for example, encountering or defeating of other characters either controlled by another user or by the game console, or completing or overcoming a certain game play challenge or obstacle. Each game play event may be associated with one or more commands to be carried out in connection with the game play event. For example, in one embodiment, the event of encountering or defeating another character may have associated with it the command of writing the identification of the defeated character to the memory of the user's toy. In block 1121, the process executes the one or more associated commands in response to detecting the game play event.

Figure 12:
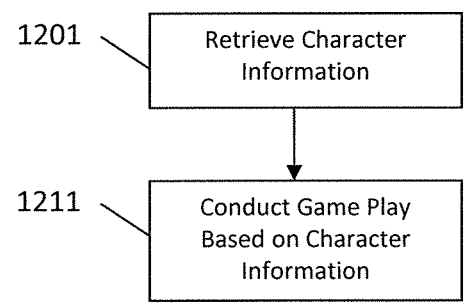
FIG. 12 is a flowchart of a process for conducting game play in accordance with aspects of the invention.

FIG. 12 is a flowchart of a process for conducting game play in accordance with aspects of the invention. In block 1201, the process retrieves information related to the character. In some embodiments the information may be retrieved by a video game system, or by part of a video game system. The character information may be retrieved from a video game disc, a remote server, a memory of the physical toy, or some combination as described above. The character information may include, for example, an identification of characters encountered or defeated by the user in previous gaming sessions. In another embodiment, the character information may include the identification of other video game objects and/or characteristics, powers, and/or attributes of characters encountered or defeated by the user in previous gaming sessions. In block 1211, the process executes instructions to conduct a game play sequence based at least on the character information retrieved. For example, in some embodiments, the user may play with or otherwise control a character encountered or defeated by the user in previous gaming sessions. In other embodiments, the character encountered or defeated by the user in previous gaming sessions may play alongside another character played by the user. In further embodiments, one of the user's characters may be altered or enhanced with the characteristics, powers, and/or abilities of characters encountered or defeated by the user in previous gaming sessions. In some embodiments the operations of block 1211 of the process are performed by a processor of the video game device.

Although the invention has been discussed with respect to various embodiments, it should be recognized that the invention comprises the novel and non-obvious claims supported by this disclosure.

What is claimed is:

1. A method useful in providing video game play using a video game device, comprising:
   providing, by the video game device, video game play in which a virtual game character, controlled by a user using user inputs is representative of a first physical object, the first physical object comprising a base with a first RFID tag, the first RFID tag in communication with the video game device;
   presenting to the user, by the video game device, a game play challenge;
   receiving, by the video game device, an indication that the user completed the game play challenge;
   after receiving the indication that the user completed the game play challenge, storing, by the video game device, information relating to the game play challenge in a second RFID tag of a second physical object in communication with the video game device.

2. The method of claim 1, wherein the information comprises an identifier.

3. The method of claim 2, wherein the identifier comprises a numeric identifier.

4. The method of claim 2, wherein the identifier specifies the video game object.

5. The method of claim 1, wherein the game play challenge relates to a virtual game object, and the virtual game object is manipulable by the virtual game character.

6. The method of claim 5, wherein the virtual game character controlled by a user using user inputs may possess the virtual game object.

7. The method of claim 1, wherein the video game device communicates with the first RFID tag of the first physical object and the second RFID tag of the second physical object through a peripheral device coupled to the video game device.

8. A computer-readable medium having computer program instructions stored thereon for providing video game play, the computer program instructions, when executed by one or more physical processors of a gaming platform, causing the gaming platform to:
   provide video game play in which a virtual game character, controlled by a user using user inputs, is representative of a first physical object, the first physical object comprising a base with a first RFID tag, the first RFID tag in communication with the gaming platform;
   present to the user a game play challenge;
   receive an indication that the user completed the game play challenge;
   after receiving the indication that the user completed the game play challenge, store information relating to the game play challenge in a second RFID tag of a second physical object in communication with the gaming platform.

9. The computer-readable medium of claim 8, wherein the information comprises an identifier.

10. The computer-readable medium of claim 9, wherein the identifier comprises a numeric identifier.

11. The computer-readable medium of claim 9, wherein the identifier specifies the video game object.

12. The computer-readable medium of claim 8, wherein the virtual game object is manipulable by the virtual game character.

13. The computer-readable medium of claim 8, wherein the virtual game character controlled by a user using user inputs may possess the virtual game object.

14. The computer-readable medium of claim 8, wherein the gaming platform communicates with the first RFID tag of the first physical object and the second RFID tag of the second physical object through a peripheral device coupled to the gaming platform.

15. The computer-readable medium of claim 8, where in the gaming platform is a gaming console.

16. A video game system for providing video game play, the video game system comprising:
   a gaming platform comprising one or more physical processors programmed by program instructions that, when executed, cause the gaming platform to:
   provide video game play in which a virtual game character, controlled by a user using user inputs, is representative of a first physical object, the first physical object comprising a base with a first RFID tag, the first RFID tag in communication with the gaming platform;
   present to the user a game play challenge;
   receive an indication that the user completed the game play challenge;
   after receiving the indication that the user completed the game play challenge, store information relating to the game play challenge in a second RFID tag of a second physical object in communication with the gaming platform.

\* \* \* \* \*

UNITED STATES PATENT AND TRADEMARK OFFICE
CERTIFICATE OF CORRECTION

PATENT NO. : 9,802,126 B2  
APPLICATION NO. : 15/395822  
DATED : October 31, 2017  
INVENTOR(S) : Paul Reiche and Ray West Page 1 of 1

It is certified that error appears in the above-identified patent and that said Letters Patent is hereby corrected as shown below:

In the Claims

In Column 16, Line 51, Claim 15, delete "where in" and insert --wherein--, therefor.

Signed and Sealed this  
Eleventh Day of June, 2019

Andrei Iancu  
*Director of the United States Patent and Trademark Office*